United States Patent
Rodriguez et al.

(10) Patent No.: US 6,850,832 B1
(45) Date of Patent: Feb. 1, 2005

(54) MAP-SCHEDULED GAINS FOR CLOSED-LOOP CONTROL OF FUEL INJECTION PRESSURE

(75) Inventors: Rogelio Rodriguez, Plainfield, IL (US); Balmes Tejeda, Chicago, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/692,866

(22) Filed: Oct. 24, 2003

(51) Int. Cl.$^7$ .............................................. F02D 41/14
(52) U.S. Cl. ...................................... 701/104; 123/674
(58) Field of Search ................................ 701/104, 103; 123/674, 675, 480, 486, 478

(56) References Cited

U.S. PATENT DOCUMENTS

| | | |
|---|---|---|
| 5,191,867 A | 3/1993 | Glassey |
| 5,460,329 A | 10/1995 | Sturman |
| 5,485,820 A | 1/1996 | Iwaszkiewicz |
| 5,597,118 A | 1/1997 | Carter, Jr. et al. |
| 5,722,373 A | 3/1998 | Paul et al. |
| 5,740,045 A * | 4/1998 | Livshiz et al. ............... 701/101 |
| 5,771,861 A * | 6/1998 | Musser et al. ............... 701/104 |
| 6,029,628 A | 2/2000 | Oleksiewicz et al. |
| 6,378,501 B1 * | 4/2002 | Hisato et al. ................ 123/458 |
| 6,415,779 B1 * | 7/2002 | Colomby ..................... 123/674 |
| 2004/0031467 A1 | 2/2004 | Bernhardt et al. |

FOREIGN PATENT DOCUMENTS

| | | | | |
|---|---|---|---|---|
| JP | 2000-282927 A | * | 10/2000 | ........... F02D/41/14 |
| JP | 2000-291493 A | * | 10/2000 | ........... F02M/25/07 |

* cited by examiner

*Primary Examiner*—Hieu T. Vo
(74) *Attorney, Agent, or Firm*—Dennis Kelly Sullivan; Susan L. Lukasik; Jeffrey P. Calfa

(57) ABSTRACT

A schedule (164, 166) correlates data values of closed-loop gain (KP, KI) with engine temperature values (EOT) and engine speed values (N). A control strategy develops a data value (ICPC_DES) representing desired injector control pressure (ICP) set-point, processes ICPC_DES and a data value (ICP_MPA) representing actual ICP to develop ICP error data value (ICP_ERR) for closed-loop P-I control (160, 162) of actual ICP. Data values for closed-loop proportional and integral gains are obtained from the schedule based on measured engine temperature and measured engine speed. ICP become less subject to undesirable fluctuations that might otherwise change fuel injection quantity in ways detrimental to attainment of desired tailpipe emission objectives.

23 Claims, 3 Drawing Sheets

MAP-SCHEDULED GAINS FOR CLOSED-LOOP CONTROL OF FUEL INJECTION PRESSURE

FIELD OF THE INVENTION

This invention relates to internal combustion engines having combustion chambers into which fuel is injected, and to systems and methods for closed-loop control of hydraulic pressure that is used to forcefully inject fuel. More specifically, the invention relates to engines, systems, and methods where fuel is forced by injection control pressure directly into engine combustion chambers in properly timed relation to engine operation to mix with air and be ignited by force of compression exerted on the mixture by pistons that reciprocate within engine cylinders forming the combustion chambers.

BACKGROUND OF THE INVENTION

A known electronic engine control system comprises a processor-based engine controller that processes data from various sources to develop control data for controlling certain functions of the engine, including fueling of the engine by injection of fuel into engine combustion chambers. Control of engine fueling involves several factors. One is the quantity of fuel injected during an injection. Another is the timing of an injection. Consequently, the control system must set both the quantity of fuel injected and the time at which the injection occurs during an engine operating cycle.

A known diesel engine that powers a motor vehicle has an oil pump that delivers oil under pressure to an oil rail serving electric-actuated fuel injection devices, or simply fuel injectors, that use oil from the oil rail to force injections of fuel. The pressure in the oil rail is sometimes referred to as injector control pressure, or ICP, and that pressure is under the control of an appropriate ICP control strategy that is an element of the overall engine control strategy implemented in the engine control system. ICP is a factor in setting the quantity of fuel injected during an injection.

Examples of fuel systems containing fuel injection devices that utilize ICP oil to force fuel into engine combustion chambers via plungers are found in U.S. Pat. Nos. 5,460,329; 5,597,118; 5,722,373; and 6,029,628. The device of the latter has a plunger that is displaced within a pumping chamber by oil at ICP from an oil rail to force fuel out of an internal pumping chamber of the device. The ICP oil pressure amplifies the fuel pressure within the device to a magnitude large enough for forcing a normally closed control valve at an outlet of the device to open. When that outlet control valve opens, the amplified fuel pressure forces fuel through the outlet and into the corresponding combustion chamber.

Because ICP in the oil rail is a significant factor in setting the quantity of fuel injected during an injection, the ability to accurately control ICP is of obvious importance in an engine control strategy. Control of ICP is of course complicated because changing engine conditions can act in ways that tend to change ICP.

Changes in desired ICP that result from the processing of certain data by a processor of the engine controller to set desired ICP are one source of complication. Another source is how a particular oil system responds to changing conditions. Consequently, closed-loop control of ICP is one strategy for securing the best correspondence of actual ICP to desired ICP.

Because control of fuel injection impacts tailpipe emissions, improvements in control of fuel injection can reduce the amount of undesired products of combustion in tailpipe emissions. Where laws and regulations concerning tailpipe emissions are becoming increasingly strict, an ability to achieve reduced tailpipe emissions is seen to be vitally important to engine and motor vehicle manufacturers.

SUMMARY OF THE INVENTION

Briefly, the present invention relates to improvements in control of ICP utilizing certain known parameters in novel ways. General principles of the invention contemplate the use of map-scheduled gains for closed-loop control of ICP. More specific principles relate to specific map implementations of temperature- and speed-scheduled gain strategies.

Because the invention provides more precise control of ICP, the pressure that actually forces each fuel injection can become less subject to undesirable instabilities and fluctuations that might otherwise change fuel injection quantity in ways detrimental to attainment of desired tailpipe emission objectives.

Accordingly a generic aspect of the invention relates to an internal combustion engine comprising a fuel system that applies injection control pressure (ICP) to fuel injectors to force fuel into combustion chambers and a control system for setting ICP in accordance with data developed by a processor of the control system. The control system comprises a map that provides a schedule that correlates data values of closed-loop gain with data values for certain operating conditions, engine temperature values and engine speed values being examples of operating condition data values. The processor comprises a control strategy a) for processing data values of various parameters to develop a data value representing a desired ICP set-point, b) for processing the desired ICP set-point data value and a data value representing actual ICP to develop an ICP error data value for closed-loop control of actual ICP, c) for selecting a data value of closed-loop gain from the map based on the data values of certain operating conditions obtained from measurements of those operating conditions, d) for processing both the selected data value of closed-loop gain and the ICP error data value to create a data value for a closed-loop output and e) and for using the data value for the closed-loop output to create a data value for a final output for forcing actual ICP to the desired ICP set-point.

Another generic aspect relates to the system that has just been described.

Still another generic aspect relates to the method that is performed by the system just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
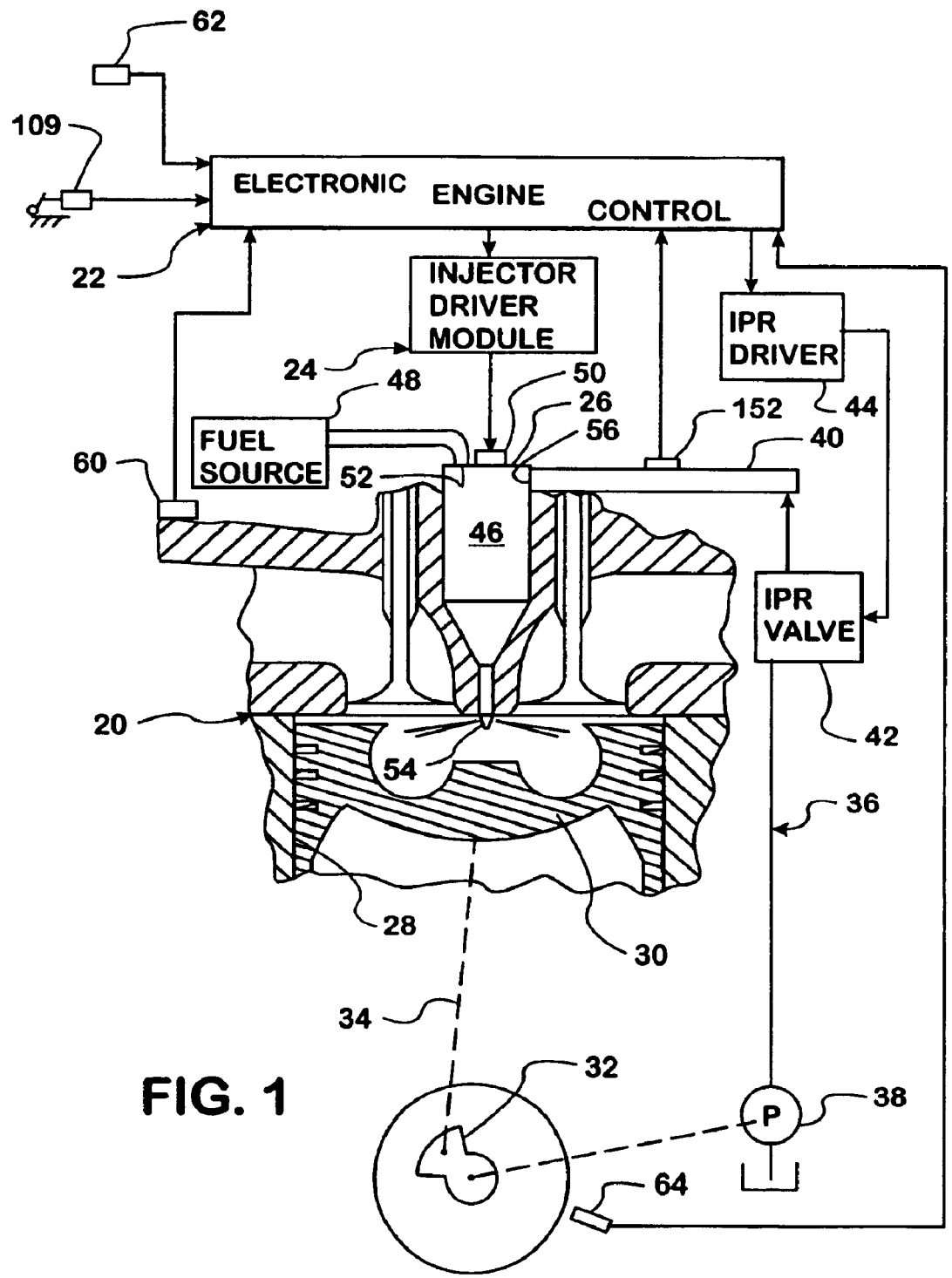
FIG. 1 is a general schematic diagram of a portion of an exemplary diesel engine relevant to an understanding of the invention.

FIG. 1 shows a schematic diagram of a portion of an exemplary diesel engine 20 relevant to an understanding of principles of the present invention. Engine 20 is used for powering a motor vehicle and comprises a processor-based engine control system 22 that processes data from various sources to develop various control data for controlling various aspects of engine operation. The data processed by control system 22 may originate at external sources, such as sensors, and/or be generated internally.

Control system 22 includes an injector driver module 24 for controlling the operation of electric-actuated fuel injection devices 26. Each device 26 mounts on the engine in association with a respective engine combustion chamber illustrated by an engine cylinder 28 within which a piston 30 reciprocates. Each piston is coupled to a crankshaft 32 by a corresponding connecting rod 34. A processor of engine control system 22 can process data sufficiently fast to calculate, in real time, the timing and duration of device actuation to set both the timing and the amount of fueling.

Engine 20 further comprises an oil system 36 having a pump 38 for drawing oil from a sump and delivering the oil under pressure to an oil rail 40 that serves in effect as a manifold for supplying oil, as a control fluid, to the individual devices 26. An injection pressure regulator (IPR) valve 42 is under the control of control system 22 via an IPR driver 44 to regulate the hydraulic pressure of oil in oil rail 40. Principles of the invention are applicable to various forms of IPR valves. One form of IPR valve comprises an electromechanical actuator that causes the valve to increasingly open as the duty cycle of a duty-cycle-modulated voltage increases, thereby increasingly diverting pumped oil away from oil rail 40.

Each device 26 comprises a body 46 that mounts on engine 20 in association with oil rail 40, a respective cylinder 28, and a source of fuel 48. Device 26 has an electrical connector 50 that provides for the electrical connection of its actuator to injector driver module 24. Fuel source 48 supplies liquid fuel to a fuel inlet port 52 of body 46. Body 46 further comprises a fuel outlet port, i.e. a nozzle 54, through which fuel is injected into cylinder 28, and a control fluid inlet port 56 that is communicated to the oil in oil rail 40.

The hydraulic pressure of the oil in rail 40 provides injector control pressure, or ICP, and it is that pressure that is controlled in accordance with the inventive strategy. The strategy operates to establish a desired set-point for ICP and cause valve 42 to operate in way that forces actual ICP in rail 40 to the desired set-point. As engine 20 runs and changing conditions call for change in the ICP set-point, the strategy continues to force actual ICP to follow the changing desired set-point for ICP.

Each device 26 has a plunger that, during the injecting phase of device operation, is displaced within an internal pumping chamber by oil at ICP from oil rail 40 to force fuel out of the pumping chamber. The timing and the stroke of the plunger are controlled by control system 22. ICP applied through the plunger to act on the fuel in the pumping chamber, amplifying the pressure of fuel to a magnitude large enough for forcing a normally closed control valve in nozzle 54 to open so that the amplified fuel pressure forces the fuel through the nozzle into cylinder 28 as the plunger is being displaced. Actual ICP in rail 40 is controlled by the inventive strategy of control system 22 acting on IPR valve 42 via driver 44.

Figure 2:
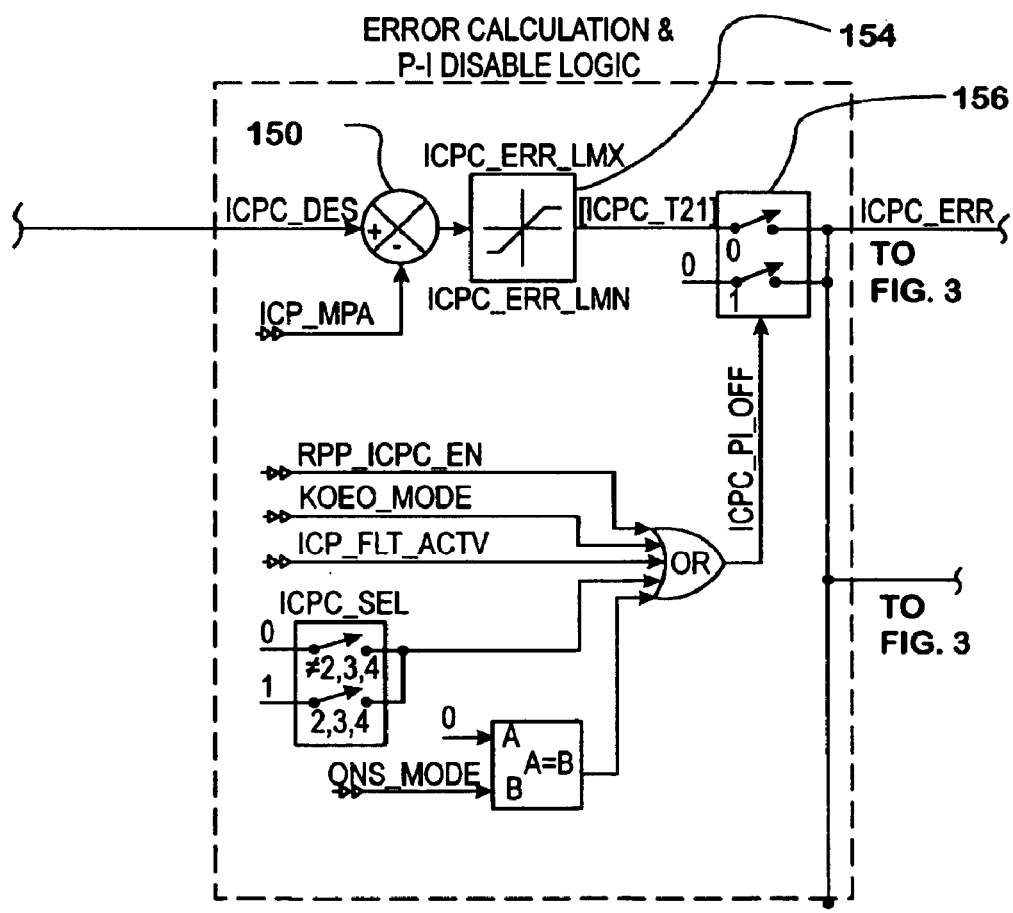
FIG. 2 is a first portion of a schematic software strategy diagram of an exemplary embodiment of control strategy according to the present invention.
Figure 3:
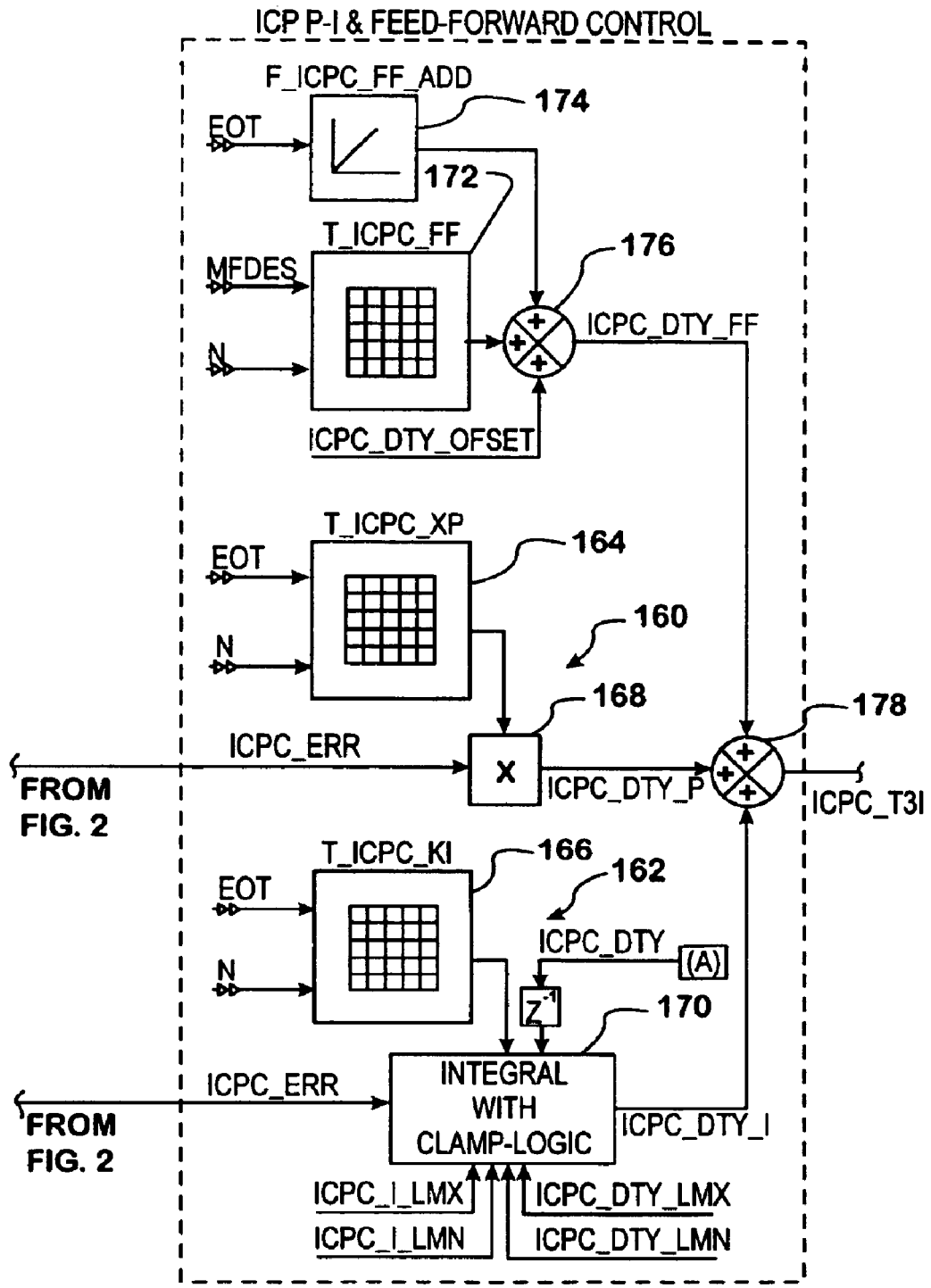
FIG. 3 is a second portion of the software strategy diagram.

FIGS. 2–3 illustrate the inventive ICP control strategy embodied in control system 22.

A desired commanded ICP (parameter ICPC_DES) is developed by control system 22 in any suitably appropriate way for the particular engine. Because engine temperature, barometric pressure, engine speed, and engine fueling can influence ICP, the processing of engine temperature data, barometric pressure data, engine speed data, and desired engine fueling data according to any suitably appropriate algorithm or algorithms is one way of developing ICPC_DES. Compensation and filtering for certain transient conditions, offset compensation, and limiting of various data may be included as appropriate.

A data value that represents a measurement of engine temperature (parameter EOT) is obtained from any suitable source, such as an engine oil temperature sensor 60 shown in FIG. 1; a data value that represents a measurement of barometric pressure (parameter BARO_KPA), from any suitable source, such as a barometric pressure sensor 62 shown in FIG. 1; a data value representing engine speed (parameter N), from any suitable source, such as a crankshaft sensor 64 shown in FIG. 1; and a data value representing desired fueling (parameter MFDES), from data generated by control system 22 as a result of processing various data inputs. As a result of the processing mentioned above, a data value for ICPC_DES is obtained.

The data value for ICPC_DES forms an input for closed-loop control of ICP. A summing function 150 in FIG. 2 is where the loop is closed. That function subtracts a data value ICP_MPA representing actual ICP as measured by any suitable means such as a pressure sensor 152 in FIG. 1, from the data value for ICPC_DES to create a data value representing the error difference between them.

That error difference is evaluated by an evaluation function 154 against minimum and maximum preset limits, as shown by FIG. 2. If the data value for the error difference is more positive than the data value for the maximum preset limit (parameter ICPC_ERR_LMX), then the data value for ICPC_ERR_LMX is passed. If the data value for the error difference is more negative than the data value for the minimum preset limit (parameter ICPC_ERR_LMN), then the data value for ICPC_ERR_LMN is passed. If the data value for the error difference is between the limits, the data value for the actual error difference itself is passed. Whatever its value, the passed data value is represented by the parameter ICPC_T21 in FIG. 2.

When closed-loop control of ICP is active, a switch function 156 passes the data value for ICPC_T21 as the data value for a parameter ICPC_ERR, which is then processed by ICP P-I & Feed-Forward Control. When closed-loop control of ICP is inactive, switch function 156 is turned off to discontinue passing the data value of ICPC_ERR. The switch function may be turned off under various circumstances such as during engine cranking, engine diagnostic testing, and calibration development.

With closed-loop control of ICP active, error data represented by the data value for ICPC_ERR is processed by both a proportional function 160 and an integral function 162, as shown in FIG. 3. A respective gain is associated with each function 160, 162, the gain KP being associated with proportional function 160 and the gain KI being associated with integral function 162. In accordance with certain principles of the invention, each gain is itself a function of engine temperature and engine speed.

FIG. 3 shows ICP P-I & Feed-Forward Control to comprise a map 164 for setting the gain for proportional function 160 and a map 166 for setting the gain for integral function 164.

Map 164 contains a number of data values of proportional gain KP, each of which correlates with a respective pair of data values, one for engine temperature EOT and one for engine speed N. Each data value for engine temperature EOT represents a corresponding fractional span of a range of engine temperatures while each data value for engine speed represents a corresponding fractional span of a range of engine speeds. For any given combination of engine temperature and engine speed, engine temperature will fall within one of its fractional spans in map 164, and engine speed within one of its fractional spans, causing the particular data value for proportional gain KP corresponding to the two respective fractional spans to be supplied to a multiplication function 168.

Map 166 contains a number of data values of integral gain KI, each of which correlates with a respective pair of data values, one for engine temperature EOT and one for engine speed N. Each data value for engine temperature EOT represents a corresponding fractional span of a range of engine temperatures while each data value for engine speed represents a corresponding fractional span of a range of engine speeds. For any given combination of engine temperature and engine speed, engine temperature will fall within one of its fractional spans in map 166, and engine speed within one of its fractional spans, causing the particular data value for integral gain corresponding to the two respective fractional spans to be supplied to an integrator 170 of integral function 162. Integrator 170 includes clamp-logic for constraining the integration rate to maximum and minimum limits.

An approximate target value for ICP set-point is provided by a feed-forward component using a map 172 that contains a number of data values representing set-point target values. Each set-point target data value correlates with a respective pair of data values, one for engine speed N and one for desired engine fueling MFDES. Each data value for engine speed represents a corresponding fractional span of the total engine speed range while each data value for desired fueling represents a corresponding fractional span of the total range of engine fueling. For any given combination of engine speed and desired fueling, engine speed will fall within one of the fractional speed spans in each map, and desired fueling within one of the fractional fueling spans, causing the particular set-point target value corresponding to the two respective fractional spans to be selected for further processing.

It should be noticed that the feed-forward target set-point selection using speed and desired fueling is an open-loop function, whereas the proportional and integral control provided by functions 160, 162 are closed-loop functions. The strategy therefore relies on an open-loop, feed-forward function to approximate the desired ICPC set-point and a closed-loop function acting in concert with the open-loop function to actually attain the desired set point.

Rather than relying on speed and desired fueling exclusively for the open-loop approximation of ICP set-point, the disclosed strategy also includes engine temperature EOT and an offset as additional factors. A function generator 174 and an offset (parameter ICPC_DTY_OFSET) provide two additional data values that are summed by a summing function 176 with the data value obtained from map 172 to create a data value for a parameter ICPC_DTY_FF representing a target data value that at least approximates desired ICP.

The data value for ICPC_DTY_FF, the data value for ICPC_DTY_P provided by proportional function 160, and the data value for ICPC_DTY_I provided by integral function 162 are algebraically summed by a summing function 178. The data value resulting from the summation is the data value for a parameter ICPC_T31, so marked in FIG. 3, that provides closed-loop control of ICP. ICPC_T31 may be subject to evaluation, such as in-range evaluation, before it is actually used to operate driver 44.

In summary then, the disclosed strategy has been shown to develop desired ICP as an input to a closed-loop control system for forcing actual ICP to correspond as closely as possible to that input. The strategy may be executed at any appropriate execution rate, such as 125 hz for example.

The combination of proportional control and integral control, i.e. P-I control, is considered a preferred form of feedback control that is most appropriate for control of ICP. The conjunction of feed-forward, open-loop control and the preferred form of closed-loop are also preferred. Generic principles of the invention may however be practiced in other than the disclosed preferred form, for example P-I-D control rather than merely P-I control.

While engine speed and engine temperature have been disclosed in the illustrated embodiment as particular operating conditions for selecting closed-loop gain, it is contemplated that closed-loop gain may be selected using one or both of those two, and/or other operating conditions.

While a presently preferred embodiment of the invention has been illsutrated and described, it should be appreciated that principles of the invention apply to all embodiments falling within the scope of the following claims.

What is claimed is:

1. An internal combustion engine comprising:
    a fuel system that applies injection control pressure (ICP) to fuel injectors to force fuel into combustion chambers; and
    a control system for setting ICP in accordance with data developed by a processor of the control system wherein,
    the control system comprises a map that provides a schedule that correlates data values of closed-loop gain with data values for certain operating conditions, and
    the processor comprises a control strategy a) for processing data values of various parameters to develop a data value representing a desired ICP set-point, b) for processing the desired ICP set-point data value and a data value representing actual ICP to develop an ICP error data value for closed-loop control of actual ICP, c) for selecting a data value of closed-loop gain from the map based on the data values of certain operating conditions obtained from measurements of those operating conditions, d) for processing both the selected data value of closed-loop gain and the ICP error data value to create a data value for a closed-loop output, and e) and for using the data value for the closed-loop output to create a data value for a final output for forcing actual ICP to the desired ICP set-point.

2. An engine as set forth in claim 1 wherein the processor comprises strategy for processing the ICP error data through both a proportional function and an integral function using a respective data value of closed-loop gain from the schedule for each of the proportional and integral functions and for using respective data values resulting from processing of the ICP error data by the respective proportional and integral functions to create the data value for the closed-loop output.

3. An engine as set forth in claim 2 wherein the processor comprises strategy for developing a data value for a feed-forward, open-loop output approximating the desired ICP set-point and for using the feed-forward, open-loop output data value in conjunction with the data value for the closed-loop output to create the data value for the final output.

4. An engine as set forth in claim 3 wherein the control system comprises an additional map containing feed-forward ICP set-point data values, each of which is correlated with both a particular data value for a first operating condition within a range of data values for that first operating condition and a particular data value for a second operating condition within a range of data values for that second operating condition, and the processor comprises strategy for selecting one of the feed-forward ICP set-point data values from the additional map on the basis of a data value for the first operating condition and of a data value for the second operating condition, and for then using the one selected feed-forward ICP set-point data value in conjunction with the data value for the closed-loop output to create the data value for the final output.

5. An engine as set forth in claim 4 wherein the additional map contains feed-forward ICP set-point data values, each of which is correlated with both a particular data value for engine speed within a range of data values for engine speed and a particular data value for desired engine fueling within a range of data values for desired engine fueling, and the processor comprises strategy for selecting one of the feed-forward ICP set-point data values from the additional map on the basis of a data value for engine speed and of a data value for desired engine fueling, and for then using the one selected feed-forward ICP set-point data value in conjunction with the data value for the closed-loop output to create the data value for the final output.

6. An engine as set forth in claim 1 wherein the processor comprises strategy for developing a feed-forward data value approximating the desired ICP set-point and for using the feed-forward data value approximating the desired ICP set-point in conjunction with the data value for the closed-loop output to create the data value for the final output.

7. An engine as set forth in claim 1 wherein the processor comprises strategy for processing a data value representing desired engine fueling, a data value representing a measurement of engine speed, the data value obtained from measurement of engine temperature, and a data value obtained from measurement of barometric pressure to develop the ICP set-point data value representing the desired ICP set-point.

8. An engine as set forth in claim 1 wherein the control system map provides a schedule that correlates data values of closed-loop gain with data values for both engine speed and engine temperature, and the processor comprises a control strategy for selecting a data value of closed-loop gain from the map based on the data values for both engine speed and engine temperature.

9. A system for control of injection control pressure (ICP) that is used to force the injection of fuel into an engine combustion chamber comprising:
a processor a) for processing data values of various parameters to develop a data value representing a desired ICP set-point, b) for processing the desired ICP set-point data value and a data value representing actual ICP to develop an ICP error data value for closed-loop control of actual ICP, c) for selecting, from a map that provides a schedule that correlates data values of closed-loop gain with data values for certain operating conditions, a data value of closed-loop gain based on the data values for those operating conditions, d) for processing both the selected data value of closed-loop gain and the ICP error data value to create a data value for a closed-loop output, and e) and for using the data value for the closed-loop output to create a data value for a final output for forcing actual ICP to the desired ICP set-point.

10. A system as set forth in claim 9 wherein the processor comprises strategy for processing the ICP error data through both a proportional function and an integral function using a respective data value of closed-loop gain from the schedule for each of the proportional and integral functions and for using respective data values resulting from processing of the ICP error data by the respective proportional and integral functions to create the data value for the closed-loop output.

11. A system as set forth in claim 10 wherein the processor comprises strategy for developing a data value for a feed-forward, open-loop output approximating the desired ICP set-point and for using the feed-forward, open-loop output data value in conjunction with the data value for the closed-loop output to create the data value for the final output.

12. A system as set forth in claim 11 the processor comprises strategy for selecting, from an additional map containing feed-forward ICP set-point data values, each of which is correlated with both a data value for a first operating condition within a range of data values for that first operating condition and a data value for a second operating condition within a range of data values for that second operating condition, one of the feed-forward ICP set-point data values on the basis of a data value for the first operating condition and of a data value for the second operating condition, and for then using the one selected feed-forward ICP set-point data value in conjunction with the data value for the closed-loop output to create the data value for the final output.

13. A system as set forth in claim 12 wherein the additional map contains feed-forward ICP set-point data values, each of which is correlated with both a particular data value for engine speed within a range of data values for engine speed and a particular data value for desired engine fueling within a range of data values for desired engine fueling, and the processor comprises strategy for selecting one of the feed-forward ICP set-point data values from the additional map on the basis of a data value for engine speed and of a data value for desired engine fueling, and for then using the one selected feed-forward ICP set-point data value in conjunction with the data value for the closed-loop output to create the data value for the final output.

14. A system as set forth in claim 9 wherein the processor comprises strategy for developing a feed-forward data value approximating the desired ICP set-point and for using the feed-forward data value approximating the desired ICP set-point in conjunction with the data value for the closed-loop output to create the data value for the final output.

15. A system as set forth in claim 9 wherein the processor comprises strategy for processing a data value representing desired engine fueling, a data value representing a measurement of engine speed, the data value obtained from the measurement of engine temperature, and a data value obtained from a measurement of barometric pressure to develop the ICP set-point data value representing the desired ICP set-point.

16. A system as set forth in claim 9 wherein the map provides a schedule that correlates data values of closed-loop gain with data values for both engine speed and engine temperature, and the processor selects a data value of closed-loop gain from the map based on the data values for both engine speed and engine temperature.

17. A method for control of injection control pressure (ICP) that is used to force the injection of fuel into an engine combustion chamber comprising:

a) processing data values of various parameters to develop a data value representing a desired ICP set-point, b) processing the desired ICP set-point data value and a data value representing actual ICP to develop an ICP error data value for closed-loop control of actual ICP, c) selecting, from a map that provides a schedule that correlates data values of closed-loop gain with data values for certain operating conditions, a data value of closed-loop gain based on the data values for those certain operating conditions, d) processing both the selected data value of closed-loop gain and the ICP error data value to create a data value for a closed-loop output, and e) and using the data value for the closed-loop output to create a data value for a final output for forcing actual ICP to the desired ICP set-point.

18. A method as set forth in claim 17 wherein the step of processing both the selected data value of closed-loop gain and the ICP error data value to create a data value for a closed-loop output comprises processing the ICP error data through both a proportional function and an integral function using a respective data value of closed-loop gain from the schedule for each of the proportional and integral functions and using respective data values resulting from processing of the ICP error data by the respective proportional and integral functions to create the data value for the closed-loop output.

19. A method as set forth in claim 17 including developing a data value for a feed-forward, open-loop output approximating the desired ICP set-point and using the feed-forward, open-loop output data value in conjunction with the data value for the closed-loop output to create the data value for the final output.

20. A method as set forth in claim 19 including selecting, from an additional map containing feed-forward ICP set-point data values, each of which is correlated with both a particular data value for a first operating condition within a range of data values for that first operating condition and a particular data value for a second operating condition within a range of data values for that second operating condition, one of the feed-forward ICP set-point data values on the basis of a data value for the first operating condition and of a data value for the second operating condition, and then using the one selected feed-forward ICP set-point data value in conjunction with the data value for the closed-loop output to create the data value for the final output.

21. A method as set forth in claim 17 including developing a feed-forward data value approximating the desired ICP set-point and using the feed-forward data value approximating the desired ICP set-point in conjunction with the data value for the closed-loop output to create the data value for the final output.

22. A method as set forth in claim 17 including processing a data value representing desired engine fueling, a data value representing a measurement of engine speed, the data value obtained from measurement of engine temperature, and a data value obtained from measurement of barometric pressure to develop the ICP set-point data value representing the desired ICP set-point.

23. A method as set forth in claim 17 wherein the map provides a schedule that correlates data values of closed-loop gain with data values for both engine speed and engine temperature, and the step of selecting a data value of closed-loop gain from the map comprises selecting a data value of closed-loop gain on the basis of data values for both engine speed and engine temperature.

* * * * *